(12) United States Patent
Tan et al.

(10) Patent No.: US 10,041,429 B2
(45) Date of Patent: Aug. 7, 2018

(54) DETECTING FUEL INJECTOR TIMING WITH CURRENT SENSING

(71) Applicant: Infineon Technologies AG, Neubiberg (DE)

(72) Inventors: Seng Hung Tervin Tan, Singapore (SG); Jin Seo Park, Singapore (SG); Patrick Leteinturier, Riemerling (DE)

(73) Assignee: Infineon Technologies AG, Neubiberg (DE)

( * ) Notice: Subject to any disclaimer, the term of this patent is extended or adjusted under 35 U.S.C. 154(b) by 89 days.

(21) Appl. No.: 14/997,907

(22) Filed: Jan. 18, 2016

(65) Prior Publication Data

US 2017/0058815 A1 Mar. 2, 2017

Related U.S. Application Data

(60) Provisional application No. 62/176,911, filed on Aug. 31, 2015.

(51) Int. Cl.
*F02D 41/20* (2006.01)
*F02D 41/34* (2006.01)

(52) U.S. Cl.
CPC ........... *F02D 41/20* (2013.01); *F02D 41/345* (2013.01); *F02D 41/34* (2013.01);
(Continued)

(58) Field of Classification Search
CPC ........ F02D 41/20; F02D 41/345; F02D 41/34; F02D 2041/2055; F02D 2041/2058
(Continued)

(56) References Cited

U.S. PATENT DOCUMENTS

| 4,681,076 A | 7/1987 | Muller |
| 5,182,517 A | 1/1993 | Thelen et al. |

(Continued)

FOREIGN PATENT DOCUMENTS

| DE | 3843138 A1 | 6/1990 |
| DE | 3942836 A1 | 6/1991 |

(Continued)

OTHER PUBLICATIONS

Calmes, "PT2000: Next-Generation Intelligent Programmable Injection Controller for 3 to 6-Cylinder DFI Engines," Freescale Technology Forum, FTF-ACC-F1269, Freescale Semiconductor, Inc., Jun. 2015, 53 pp.

(Continued)

*Primary Examiner* — Joseph Dallo
*Assistant Examiner* — Yi-Kai Wang
(74) *Attorney, Agent, or Firm* — Shumaker & Sieffert, P.A.

(57) ABSTRACT

A fuel injection system for an internal combustion engine includes a fuel injector and an engine control system. The engine control system is configured to send electrical fuel injection signals to the fuel injector to open the fuel injector, monitor a current amplitude of electrical fuel injection signals, detect the mechanical openings of the fuel injector based on the monitored current amplitudes of electrical fuel injection signals according to inflection points between a decreasing slope and an increasing slope in the monitored current amplitudes of electrical fuel injection signals, calculate time delays between the sent electrical fuel injection signals and the mechanical openings of the fuel injector, and set durations of electrical fuel injection signals based on the calculated time delays.

18 Claims, 6 Drawing Sheets

(52) U.S. Cl.
CPC ............... *F02D 2041/2055* (2013.01); *F02D 2041/2058* (2013.01); *Y02T 10/44* (2013.01)

(58) Field of Classification Search
USPC ........................................................ 123/478
See application file for complete search history.

(56) References Cited

U.S. PATENT DOCUMENTS

| | | | |
|---|---|---|---|
| 5,245,501 A | | 9/1993 | Locher et al. |
| 5,474,054 A | | 12/1995 | Povinger et al. |
| 5,605,136 A | | 2/1997 | Nakashima |
| 5,924,403 A | | 7/1999 | Thomas |
| 6,360,725 B1 | | 3/2002 | Scherrbacher |
| 6,879,903 B2 * | | 4/2005 | Jaliwala ............... F02D 41/2441 123/478 |
| 6,949,923 B2 | | 9/2005 | Schultz et al. |
| 7,280,339 B2 | | 10/2007 | Manzone et al. |
| 7,751,967 B2 | | 7/2010 | Grai et al. |
| 2011/0221264 A1 * | | 9/2011 | Saita ..................... B60T 8/36 303/20 |
| 2014/0069389 A1 * | | 3/2014 | Nishimura ............ F02D 41/20 123/478 |
| 2015/0057806 A1 | | 2/2015 | Schweikert et al. |
| 2016/0138511 A1 * | | 5/2016 | Toyohara ............... F02D 41/20 123/478 |
| 2016/0177855 A1 * | | 6/2016 | Kusakabe .............. F02D 41/20 123/490 |
| 2016/0237937 A1 * | | 8/2016 | Kusakabe .............. F02D 41/20 |
| 2016/0281624 A1 * | | 9/2016 | Dames ................... F02D 41/40 |

FOREIGN PATENT DOCUMENTS

| | | |
|---|---|---|
| DE | 4322199 A1 | 1/1995 |
| DE | 10150199 A1 | 4/2003 |
| DE | 102011076363 A1 | 11/2012 |
| WO | 9949195 A1 | 9/1999 |

OTHER PUBLICATIONS

Office Action, in the German language, from counterpart German Application No. 102016115522.5, dated Oct. 25, 2017, 5 pp.

* cited by examiner

IN THIS EXAMPLE INJECTOR CLOSES
EARLY FOR N-1 => TIME ADDED TO IPW(N)

DETECTING FUEL INJECTOR TIMING WITH CURRENT SENSING

TECHNICAL FIELD

The invention relates to control of electromagnetic actuators, and more particularly, but without limitation, to port fuel injectors for internal combustion engines.

BACKGROUND

One application for electromagnetic actuators is fuel injection systems for internal combustion engines in which the solenoid valves are as used solenoid fuel injectors. Fuel injectors for internal combustion engines operate according to electrical signals from an engine control system. When a fuel injector receives an injection signal, there is a time delay before the injector opens to allow fuel to pass. This delay is the time required for the fuel injector to mechanically open.

SUMMARY

An engine control system for an internal combustion engine controls fuel injectors to provide precise quantities of fuel for each power stroke of the engine. The engine control system compensates for the time delay between an injection signal sent by the engine control system and the opening of a fuel injector in order to precisely control a quantity of fuel delivered by a fuel injector. However, the time delay may vary according to the mechanical properties of an injector and various operating factors. As disclosed herein, the engine control system may detect the mechanical opening of a fuel injector following the sending of an injection signal to the fuel injector by monitoring an electrical current of the injector signal. In some examples, the current may present a brief dip in amplitude representing the mechanical opening of the injector. The engine control system may then adjust the timing of electrical fuel injection signals to account for the detected time delay of the opening of a fuel injector following the initiation of the injection signal.

In one example, this disclosure is directed to a fuel injection system for an internal combustion engine comprising a fuel injector and an engine control system. The engine control system is configured to send electrical fuel injection signals to the fuel injector to open the fuel injector, monitor an electrical current amplitude of electrical fuel injection signals, detect the mechanical openings of the fuel injector based on the monitored electrical current amplitudes of electrical fuel injection signals according to inflection points between a decreasing slope and an increasing slope in the monitored current amplitudes of electrical fuel injection signals, calculate time delays between the sent electrical fuel injection signals and the mechanical openings of the fuel injector, and set durations of electrical fuel injection signals based on the calculated time delays.

In another example, this disclosure is directed to a method of controlling a fuel injection system for an internal combustion engine comprising sending electrical fuel injection signals to a fuel injector to open the fuel injector, monitoring an electrical current amplitude of electrical fuel injection signals, detecting the mechanical openings of the fuel injector based on the monitored electrical current amplitudes of the electrical fuel injection signals according to inflection points between a decreasing slope and an increasing slope in the monitored current amplitudes of electrical fuel injection signals, calculating time delays between the sent electrical fuel injection signals and the mechanical openings of the fuel injector, and setting duration of the electrical fuel injection signals based on the calculated time delays.

In a further example, this disclosure is directed to a computer-readable storage medium that stores computer-executable instructions that, when executed, configure a control system for a fuel injector to send electrical fuel injection signals to a fuel injector to open the fuel injector, monitor an electrical current amplitude of electrical fuel injection signals, detect the mechanical openings of the fuel injector based on the monitored electrical current amplitudes of electrical fuel injection signals according to inflection points between a decreasing slope and an increasing slope in the monitored current amplitudes of electrical fuel injection signals, calculate time delays between the sent electrical fuel injection signals and the mechanical openings of the fuel injector, and set duration of the electrical fuel injection signals based on the calculated time delays.

The details of one or more examples are set forth in the accompanying drawings and the description below. Other features, objects, and advantages of this disclosure will be apparent from the description and the figures, and from the claims.

DETAILED DESCRIPTION

Fuel injection systems used with internal combustion engines generally include one or more solenoid fuel injectors. The description below is particularly related to a driver unit for controlling the operation of the solenoid injectors, the driver unit being part of the engine control system for the internal combustion engine. Such driver units, however, can also be applied to other inductive actuators, such as, for example, hydraulic valves, and not only to solenoid injectors for combustion engines. Thus, the present disclosure should not be regarded as limiting to driver units for solenoid fuel injectors.

The disclosed techniques may be useful for more precisely controlling fuel flow through solenoid fuel injectors. More precisely controlling fuel flow through solenoid fuel injectors may improve fuel economy and/or reduce emission levels. While many engines now use direct fuel injection systems, port fuel injection is still used in many vehicles as port fuel injection systems are generally less complex and cheaper than direct fuel injection systems.

As disclosed herein, the electric current profile of an injector current signal may be used to measure injector deadtime to facilitate improved injector deadtime compensation strategy to more precisely control fuel flow through solenoid fuel injectors. Fuel injector deadtime is the time delay between applying the injector signal and the time the injector mechanically opens. This disclosure uses the terms injector and fuel injector interchangeably. The disclosed techniques may allow fuel mass to be accurately delivered into the cylinder, in-spite of actuator parameter changes with temperature (e.g. resistance/inductance) and actuator positive terminal voltage fluctuation in the field. In this manner, the disclosed techniques may address production variation of fuel injectors as well as changing characteristics over time through aging.

Figure 1:
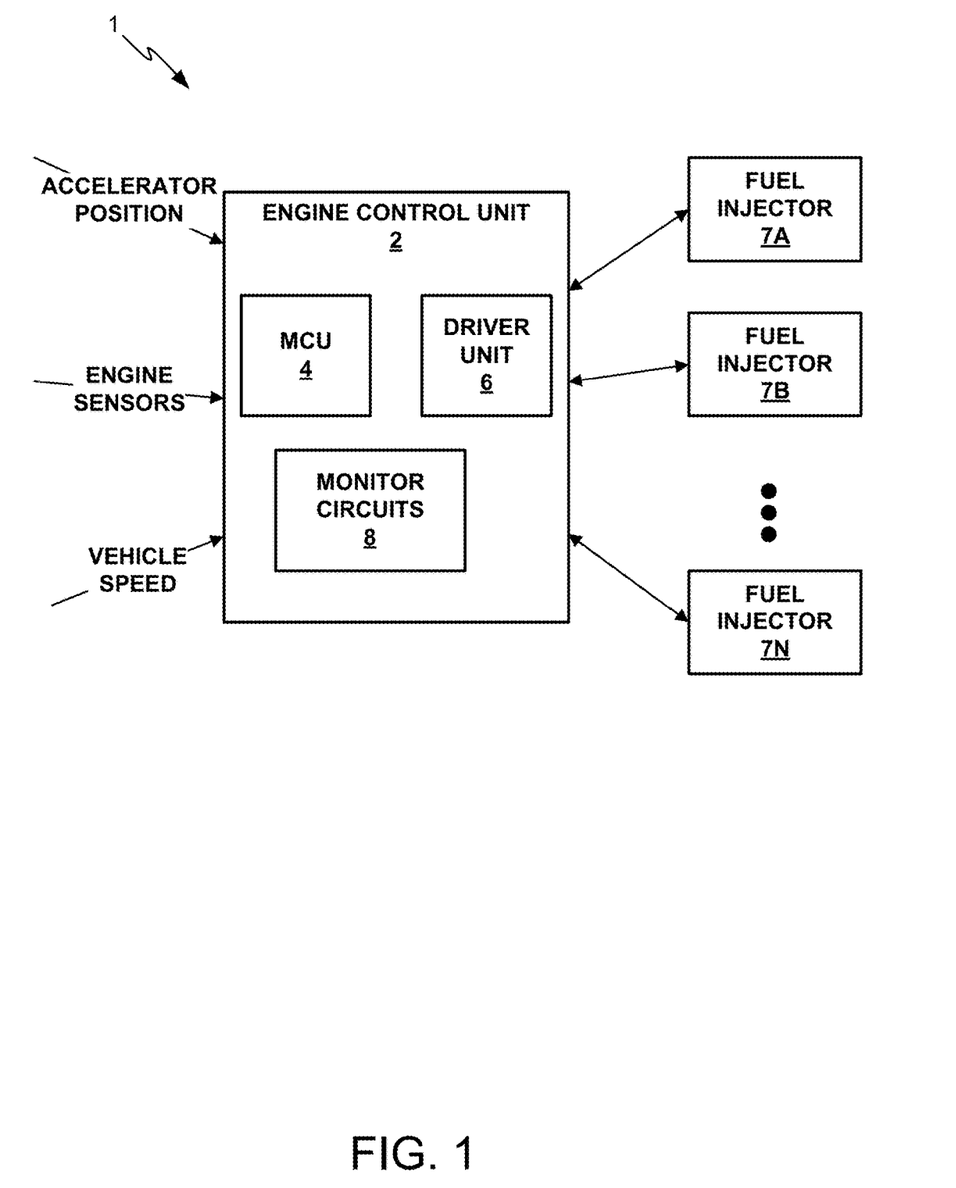
FIG. 1 is a conceptual and schematic diagram of a fuel injection system consistent with this disclosure.

FIG. 1 is a conceptual and schematic diagram of an example engine control system 1 that may be configured to control the operation of inductive actuators, in particular a system for controlling the operation of a plurality of solenoid valves as used in fuel injectors. Engine control system 1 may include an engine control unit (ECU) 2 with input signals, such as accelerator position, vehicle speed and other engine sensors. ECU 2 may send electrical fuel injection signals to and monitor feedback signals from a plurality of fuel injectors, depicted by fuel injectors 7A through 7N. ECU 2 may contain motor control unit (MCU) 4, driver unit 6 and monitor circuits 8.

MCU 4 may control the timing, duration, amplitude and other characteristics of the electrical fuel injection signals based in part on the input signals to engine control unit 2. MCU 4 may control the electrical fuel injection signals by controlling driver unit 6, which may be configured to generate the electrical fuel injection signals. Monitor circuits 8 may process feedback signals from the plurality of fuel injectors 7 send feedback information to MCU 4. This enables MCU 4 to implement a control loop. MCU 4 may further adjust the electrical fuel injection signal based in part on the feedback signals from the plurality of fuel injectors 7, processed by monitor circuits 8. For example, MCU 4 may set a duration of the electrical fuel injection signals.

Figure 2:
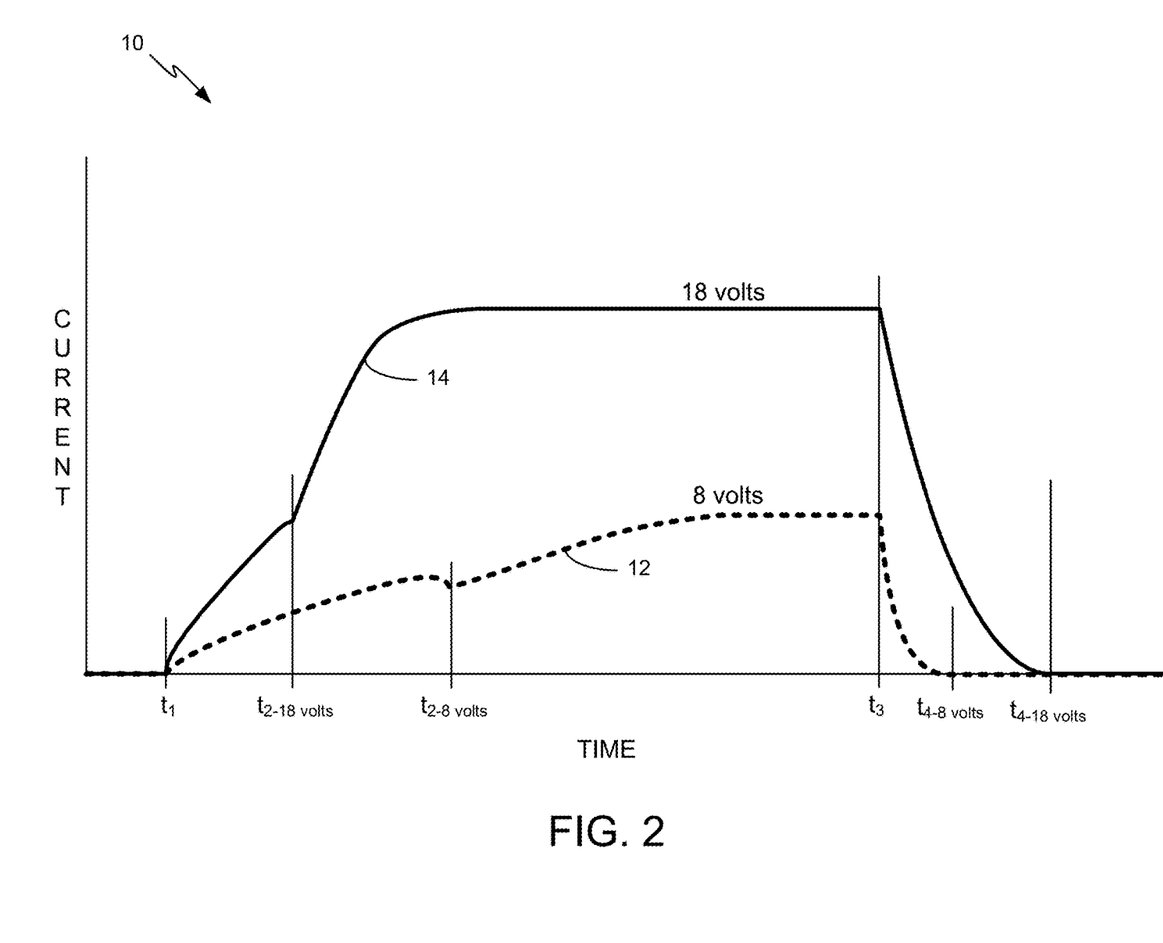
FIG. 2 is a graph illustrating detected current for a fuel injector at different fuel injection signal voltages consistent with this disclosure.

FIG. 2 is a graph 10 illustrating detected electrical current signals 14, 12 for a port fuel injector at different fuel injection signal voltages: 18 volts and 8 volts. FIG. 2 illustrates a simple ramping up of current signals 14, 12 to a maximum level accordingly to the applied voltages of 18 and 8 volts. The ramping is caused by applying a voltage to the coil of a solenoid $$\left(V = L\frac{di}{dt}\right).$$

As illustrated by FIG. 2, the time delay between applying the injection signal and the mechanical opening for the fuel injector is from $t_1$ to $t_{2\text{-}18\ volts}$ for fuel injection signal voltage of 18 volts. This time delay is shorter than the time delay for the fuel injector a fuel injection signal voltage of 8 volts, which is from $t_1$ to $t_{2\text{-}8\ volts}$. Thus, FIG. 2 represents the importance of adjusting the duration of an electrical fuel injection signal according to the response to the signal by the fuel injector solenoid. The time delay (aka deadtime) between applying the injection signal and the mechanical opening for the fuel injector may be called injector opening time (IOT). Note that there are two time delays depicted in FIG. 2. The first is the IOT time just described. The second is the time delay between removing the injection signal and the mechanical closing of the injector. This second time delay will be described in more detail below.

FIG. 2 further illustrates different electric current signal responses 14, 12 to the mechanical opening of the fuel injector. In particular, the current signal 12 for a fuel injection signal voltage of 8 volts includes a distinct dip in amplitude at $t_{2\text{-}8\ volts}$, whereby the amplitude of the current signal 12 actually drops with the mechanical opening of the fuel injector at $t_{2\text{-}8\ volts}$. In contrast, for the fuel injection signal voltage of 18 volts, while the rate of the current signal 14 change is disrupted with the mechanical opening of the fuel injector, the amplitude of the current signal 14 is not actually reduced with the mechanical opening of the fuel injector at $t_{2\text{-}18\ volts}$. Instead, the mechanical opening of the fuel injector can be characterized by the changing slope of the current signal 14 at $t_{2\text{-}18\ volts}$. In particular, up until at $t_{2\text{-}18\ volts}$, the slope of the current signal 14 for the fuel injection signal voltage of 18 volts continuously decreases until it reaches $t_{2\text{-}18\ volts}$. Then, at $t_{2\text{-}18\ volts}$, the slope of the current signal 14 increases, creating a detectable inflection in current signal 14.

Notably, while the current signal 12, for a fuel injection signal voltage of 8 volts, includes a distinct dip in amplitude at $t_{2\text{-}8\ volts}$, the current signal 12 also includes an inflection point in which the slope of the current signal 12 continuously decreases until it reaches $t_{2\text{-}8\ volts}$. Then, at $t_{2\text{-}8\ volts}$, the slope of the current signal 12 increases, also creating a detectable inflection in the current signal 12.

As also illustrated in FIG. 2, the solenoid current in signals 14, 12 starts to fall to zero at $t_3$, but there is another delay time until the solenoid current has finally dropped to zero at $t_{4\text{-}8\ volts}$ and $t_{4\text{-}18\ volts}$. This is caused by removing the voltage from the solenoid coil, according to the same equation as above $$\left(V = L\frac{di}{dt}\right)$$

and may be called injector_current_turn_off_time. As represented by FIG. 2, the turn-off delay time $$\left(\frac{di}{dt}\right)$$

for signal 14 is greater than the turn-off delay time for signal 12 after $t_3$.

Monitor circuit 8 may detect the mechanical openings of fuel injectors according to this detectable inflection in the current signals 14, 12. In some examples, monitor circuits 8 may also look for a dip in the amplitude of the current signal 12 in order to detect the mechanical opening of the fuel injector via monitoring of the fuel injector. Such detected openings may be used by a motor control unit 4 (MCU) to calculate time delays between the sent electrical fuel injection signals and the mechanical openings of the fuel injector. MCU 4 may further set the duration of the electrical fuel injection signals based on the calculated time delays in order to deliver desired quantities of fuel with the fuel injectors. In some examples, the fuel injector may further experience leakage during periods of closure, which may also be accounted for when determining the total amount of fuel delivered through the fuel injector.

The techniques disclosed herein may be particularly useful to port fuel injectors, which generally provide the detectable mechanical openings within current signals. However, as discussed above the disclosed techniques may be applied to any system including solenoid actuators that provide the detectable mechanical openings within current signals. Such examples include other hydraulic valve applications in addition to port fuel injectors.

Figure 3:
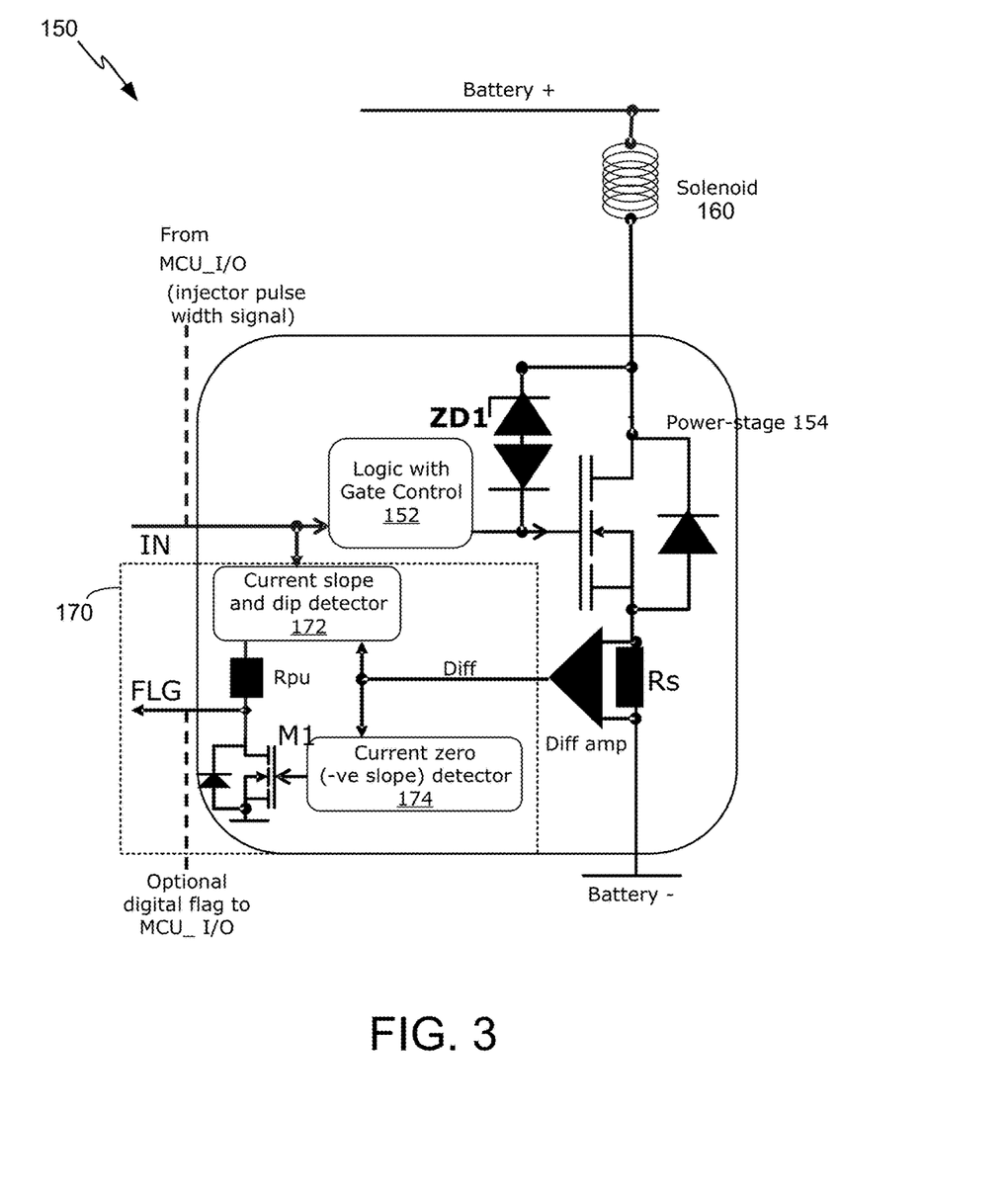
FIG. 3 illustrates an example of a conceptual circuit diagram configured to drive a solenoid fuel injectors and detect current driving the solenoid fuel injector.

FIG. 3 illustrates a conceptual circuit diagram 150 configured to drive solenoid 160, which may be the solenoid for a fuel injector, and detect electric current driving the solenoid fuel injector with sense resistor $R_s$. Circuit diagram 150 illustrates an input signal IN to turn on solenoid 160. Logic with gate control 152 operates power stage 154 in order to turn solenoid 160 on and off according to the input signal IN. Input signal IN may come from MCU 4 that is part of an engine control system for the internal combustion engine. Driver unit 6 may include components such as logic with gate control 152 and power stage 154.

Sense resistor $R_s$ may measure the current driving solenoid 160, and the output the differential amplifier (diff amp) for sense resistor $R_s$ is fed to solenoid current monitor circuit 170. Solenoid current monitor circuit 170 includes current slope and dip detector 172, which may function to detect the mechanical opening of solenoid 160 and current zero (−ve slope) detector 174. Current zero (−ve slope) detector 174 may function to detect the mechanical closing of solenoid 160 according to the absence of current from sense resistor $R_s$ (e.g. indicated as $t_4$ in FIG. 2). Solenoid current monitor circuit 170 may combine the output of current slope and dip detector 172 and current zero (−ve slope) detector 174 to produce flag signal (FLG). FLG may turn on with the mechanical opening of solenoid 160 as detected by current slope and dip detector 172 and turns off with the mechanical closing of solenoid 160 as detected by current zero (−ve slope) detector 174. Flag signal FLG may be an analog or digital signal.

FIG. 3 depicts one example technique to monitor electrical current through a solenoid. While solenoid current monitor circuit 170 is shown as including discrete circuit components, all or a portion of the techniques described with respect to solenoid current monitor circuit 170 may also be accomplished digitally. In the example of an actual running engine, the battery voltage level may be dynamically fluctuating. Therefore, it may be an advantage to capture the actual "dip" event that corresponds to the mechanical opening of the fuel injector valve. The discontinuities in the rising injector current may indicate the mechanical opening of the injector valve. By monitoring the time when the electrical current of the injector signal goes to zero (injector current turn off time), MCU 4, ECU 2, or another component of engine control system 1 or a combination thereof, may calculate the mechanical closing time (ICT) of the injector. This may be an advantage over monitoring the injection signal voltage level in a dynamically fluctuating environment.

Figure 4A:
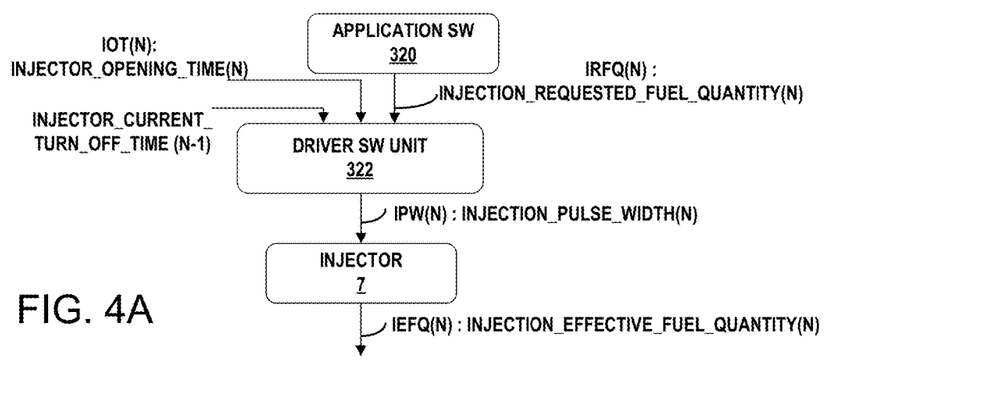
FIG. 4A is a flowchart illustrating example software components, inputs and outputs of a portion of an example engine control system.

FIG. 4A illustrates how engine control system 1 may determine the injection effective fuel quantity (IEFQ) that may be used as part of a closed-loop system to set the duration for the electrical fuel injection signal. The application software (SW) 320 may transmit a desired fuel quantity based on, for example, the position of the throttle, the revolutions per minute (RPM) of the engine, engine temperature, air temperature, and input from other sensors. Application SW 320 may transmit the desired fuel quantity to the injection driver software (SW) unit 322 as a signal called the injection requested fuel quantity (IRFQ). The driver SW unit may also monitor the injector opening time of the ongoing injector pulse [IOT(n)] as well as the injector current turn off time from the previous injector pulse (n−1). In response to these three inputs, the driver SW unit 322, may calculate ICT(n) and set the duration of the electrical fuel injection signal. This set duration may be called the injection pulse width [IPW(n)]. Driver SW unit 322 may energize injector 7 for the duration of IPW(n). Injector 7 will deliver an injection effective fuel quantity [IEFQ(n)] in response to the actual mechanical opening time and an actual mechanical closing time of injector 7.

Note that driver SW unit 322 may be a component of MCU 4, though this disclosure describes driver SW unit 322 as a separate entity in this example. Also, application SW 320 may be implemented in MCU 4, ECU 2, or another component of engine control system 1 or a combination thereof. Application SW 320 and driver SW unit 322 may be implemented as software, firmware or hardware as further described below.

Figure 4B:
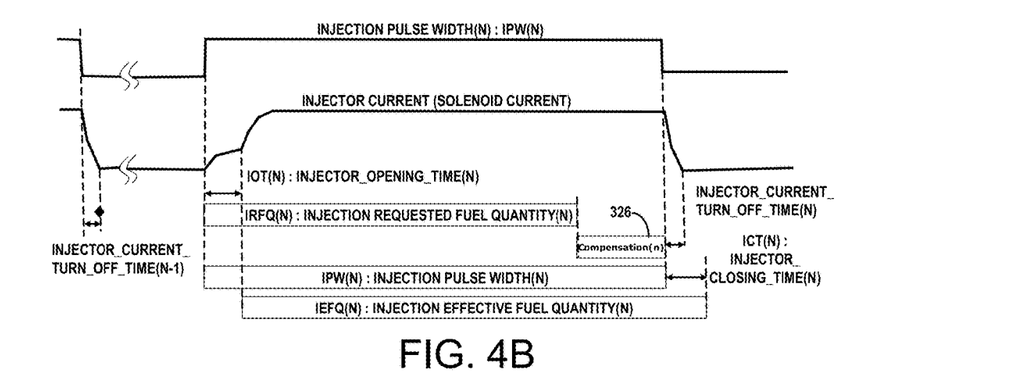
FIGS. 4B and 4C are graphs illustrating the events in an example four-stroke internal combustion engine cycle.

FIG. 4B is a graph illustrating the operation as a function of time of the fuel injector 324 and engine control system 1 shown in FIG. 4A. MCU 4 may monitor the electrical injector current amplitude of the electrical fuel injection signal (e.g. 12 and 14 of FIG. 2) and may determine the injector current turn off time (n−1) from a first pulse (e.g. any previous pulse) of the electrical fuel injection signal. During a second pulse (e.g. any on-going, subsequent pulse) of the electrical fuel injection signal, MCU 4 may determine the IOT of the ongoing pulse [IOT(n)] by detecting the inflection in the electrical current, as described above. As shown in FIG. 4A, driver SW unit 322 receives the injector current turn off time (n−1) and IOT(n). Driver SW unit 322 may set the compensation time for the ongoing pulse 326 [compensation(n)] based in part on IRFQ(n), injector current turn off time (n−1) and IOT(n), as described above. This combination of inputs may set the duration of the ongoing (second) pulse of the electrical fuel injection signal, IPW(n) according to the equation:

IPW(*n*)=IRFQ(*n*)+IOT(*n*)−ICT(*n*−1)

FIG. 4B also depicts the end of IPW(n) and MCU 4 may continue to monitor the electrical current to determine injector current turn off time (n) and ICT(n). These values may be used to set the duration for one or more subsequent pulses. Note that injector current turn off time (n) and ICT(n) cannot be used to set the duration for IPW(n) because MCU 4 cannot calculate these values after IPW(n) is complete.

Figure 4C:
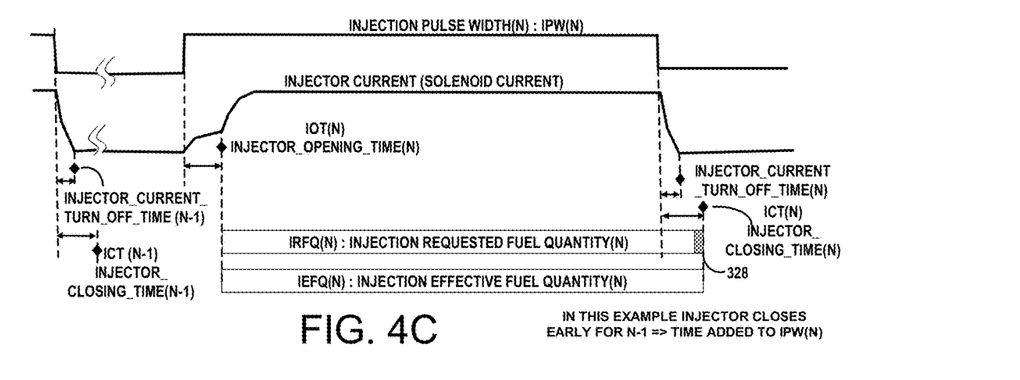

FIG. 4C illustrates how injector current turn off time (n−1) and ICT(n−1) may be used to set the duration for one or more subsequent pulses. As described above, MCU 4 may monitor the injector current (solenoid current) to determine injector current turn off time (n−1) and ICT(n−1). In one example, ICT(n−1) may occur too early, providing less fuel than required by application SW 320. This may lead to an error between IRFQ(n) and IEFQ(n), according to the following equation:

Error btw IRFQ/IEFQ=ICT(*n*)−ICT(*n*−1)

An internal combustion engine that has less fuel in the fuel-air mixture than needed for the conditions at a given moment may be considered to run lean. Running too lean may cause an engine to run too hot, cause pre-ignition and can reduce efficiency and engine life.

This error can be corrected as closed-loop feedback by engine control system 1 with MCU 4 transmitting injector current turn off time (n−1) and ICT(n−1) to driver SW unit 322. As above, driver SW unit 322 determines IPW(n) according to the following equation:

IPW(*n*)=IRFQ(*n*)+IOT(*n*)−ICT(*n*−1)

Because ICT(n−1) is shorter, it will subtract less time and IPW(n) will be longer by the amount shown by item 328. Item 328 is equivalent to the error between IRFQ(n) and IEFQ(n), shown above.

In another example, ICT(n−1) may occur too late, causing the engine to have more fuel than required by application SW 320 for electrical fuel injection signal (n−1). An internal combustion engine with more fuel in the fuel-air mixture than required may be considered to run rich. Running rich can lead to lower efficiency, incomplete fuel ignition and increased emissions. Again, engine control system 1 may measure the error and feed this back as a closed-loop input to driver SW 322. In this example, with the engine running rich, IRFQ(n−1)< IEFQ(n−1), therefore driver SW unit 322 may compensate to set the duration of IPW(n) to be shorter by the amount of the error (not shown).

In this way, engine control system 1 may facilitate improved injector compensation strategy to more precisely control fuel flow through solenoid fuel injectors. More precisely controlling fuel flow through solenoid fuel injectors may improve fuel economy and/or reduce emission levels.

Figure 5:
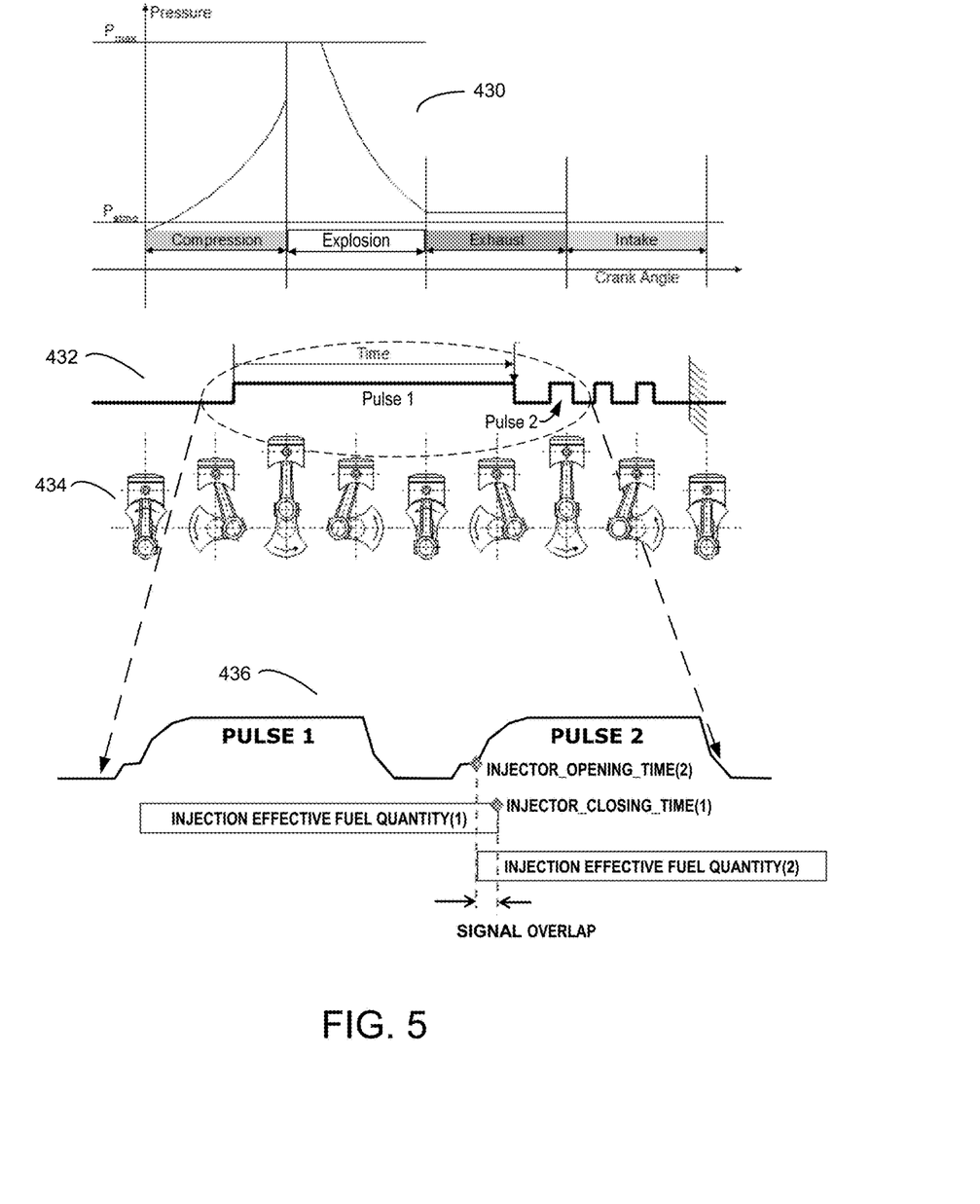
FIG. 5 is a diagram illustrating the phases of an example four-stroke internal combustion engine cycle consistent with this disclosure.

FIG. 5 illustrates another example to precisely control fuel flow. FIG. 5 also illustrates the desirability of ensuring an injector is completely closed before starting a second pulse. In FIG. 5, item 430 depicts a four-stroke engine cycle. As described above, the engine may run lean if the injector closes too early. In the case of a lean piston cycle, another example technique to add more fuel for the next piston cycle is to include one or more short injection signal pulses as shown in 432. Item 434 illustrates the possible piston positions through a four stroke cycle for an internal combustion engine. The injection signal graph 436 illustrates an instance where pulse 2 begins before the mechanical closing of the injector for pulse 1 [injector_closing_time(1)]. As shown in this example injector_opening_time(2) may begin before injector_closing_time(1). If the injector signal pulse 2 causes the injector to open before it closes for the previous pulse, engine control system 1 may not be able to accurately calculate the injection effective fuel quantity. In this example, 436 shows injector_effective_fuel_quantity(1) overlaps injector_effective_fuel_quantity(2). The size of the signal overlap may be difficult to determine. Therefore, for engine control system 1 to accurately measure effective fuel quantity, the injector must be mechanically closed before the start of a subsequent pulse.

Figure 6:
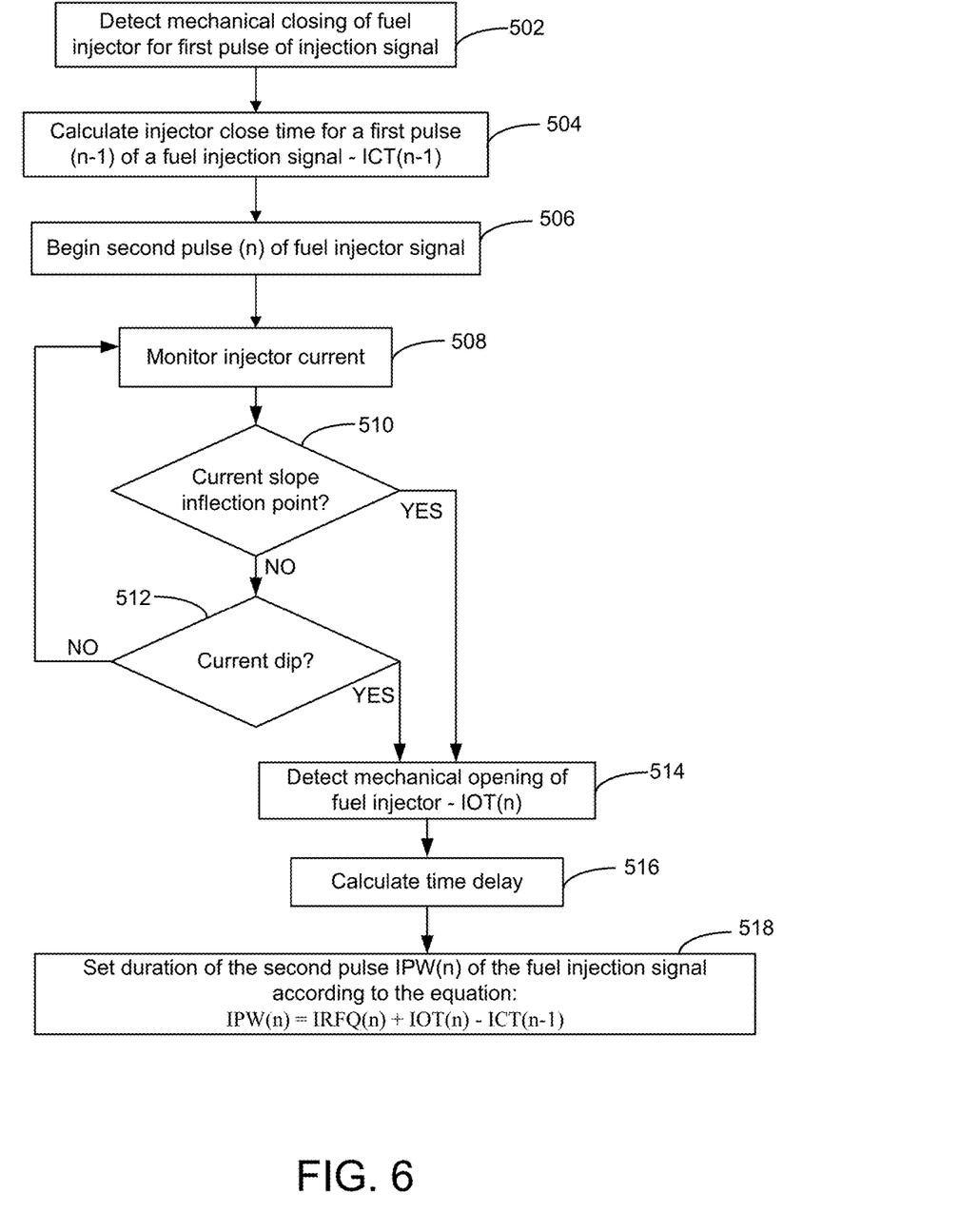
FIG. 6 is a flowchart illustrating example techniques for controlling a fuel injector for based on monitoring electrical current driving the fuel injector.

FIG. 6 is a flowchart illustrating example techniques for controlling a fuel injector based on monitoring electrical current driving the fuel injector. For clarity, the techniques of FIG. 6 are described with respect to FIGS. 1-4.

Monitor circuits 8 may detect the injector mechanical closing time of a previous pulse of the fuel injection signal (502). MCU 4 may calculate the injector mechanical closing time for the previous pulse (504) of the fuel injection signal [ICT(n−1)]. MCU 4 may trigger driver unit 6 to begin the electrical fuel injection signal to fuel injector 7 (FIGS. 1, 4). More particularly, fuel injector 7 may contain a solenoid, such as solenoid 160 in FIG. 3. Driver unit 6 may begin the second pulse of electrical fuel injector signal to the solenoid of fuel injector 7(506), represented by 12 and 14 in FIG. 2. Solenoid monitor circuit 170, in FIG. 3, may monitor the injector current amplitude of the electrical fuel injection signal (508). Solenoid monitor circuit 170 may detect a change in slope (e.g. an inflection point) (510) or dip (512) and transmits a flag (FLG) to monitor circuit 8. In turn, MCU 4, ECU 2, or another component of engine control system 1 or a combination thereof, may detect the mechanical openings of fuel injector 7 (514). In other words, as discussed with respect to FIG. 2, MCU 4, ECU 2, or another component of engine control system 1 or a combination thereof may detect the mechanical opening of the fuel injector 7 (514) based on the monitored current amplitudes of electrical fuel injection signals according to either inflection points between a decreasing slope and an increasing slope or optionally based on detecting dips in the monitored current amplitudes of electrical fuel injection signals (508, 510, 512).

MCU 4, ECU 2, or another component of engine control system 1 or a combination thereof, then calculates time delays between the electrical fuel injection signals sent to solenoid 160 and the mechanical openings of fuel injector 7 (516). MCU 4, ECU 2, or another component of engine control system 1 or a combination thereof, then sets duration of the electrical fuel injection signals based on the calculated time delays (518). The set duration may be further based on a desired quantity of fuel to be delivered by the fuel injector (IRFQ), as discussed above. The set duration of delivered electrical fuel injection signals may then be based in part on the calculated time delays of the ongoing pulse, as well as the feedback signals from the previous pulse of the electrical fuel injection signal. Driver SW unit 322 may set duration of electrical fuel injection signals based in part on the calculated time delays between the electrical fuel injection signals sent to solenoid 160 and the mechanical opening of the fuel injector 7 (518).

The techniques described in this disclosure may be implemented, at least in part, in hardware, software, firmware, or any combination thereof. For example, various aspects of the described techniques, including the disclosed engine control systems, ECU 2 and MCU 4, may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "control system" or "controller" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a transitory or non-transitory computer-readable storage medium, containing instructions. Instructions embedded or encoded in a computer-readable medium, including a computer-readable storage medium, may cause one or more programmable processors, or other processors, such one or more processors included in a control system, to implement one or more of the techniques described herein, such as when instructions included or encoded in the computer-readable medium are executed by the one or more processors. Non-transitory computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer-readable media. In some examples, an article of manufacture may comprise one or more computer-readable storage media.

Example 1

A fuel injection system for an internal combustion engine comprising: a fuel injector; and an engine control system configured to: send electrical fuel injection signals to the fuel injector to open the fuel injector; monitor an electrical current amplitude of electrical fuel injection signals; detect the mechanical openings of the fuel injector based on the monitored electrical current amplitudes of electrical fuel injection signals according to inflection points between a decreasing slope and an increasing slope in the monitored electrical current amplitudes of electrical fuel injection signals; calculate time delays between the sent electrical fuel injection signals and the mechanical openings of the fuel injector; and set durations of electrical fuel injection signals based on the calculated time delays.

Example 2

The fuel injection system of example 1, wherein the engine control system is configured to detect the mechanical openings of the fuel injector based on the monitored electrical current amplitudes of electrical fuel injection signals further according to dips in the monitored electrical current amplitudes of electrical fuel injection signals.

Example 3

The fuel injection system of any combination of examples 1 and 2, wherein the engine control system is further configured to predict a second time delay for the mechanical closings of the fuel injector for a second pulse based on the measured first time delay of the mechanical closings of the fuel injector for a first pulse, and wherein the set durations of the electrical fuel injection signals is further based in part on the predicted second time delays for the mechanical closings of the fuel injector.

Example 4

The fuel injection system of any combination of examples 1-3, wherein the set duration of the electrical fuel injection signals is further based on a desired quantity of fuel to be delivered by the fuel injector.

Example 5

The fuel injection system of any combination of examples 1-4, wherein the engine control system includes a sense resistor within an electrical current path for the fuel injector to measure the electrical current amplitude of electrical fuel injection signals.

Example 6

The fuel injection system of any combination of examples 1-5, wherein the time delays between the sent electrical fuel injection signals and the mechanical openings of the fuel injector are dependent on voltages of the electrical fuel injection signals.

Example 7

The fuel injection system of any combination of examples 1-6, wherein the fuel injector is a port fuel injector.

Example 8

A method of controlling a fuel injection system for an internal combustion engine comprising: sending electrical fuel injection signals to a fuel injector to open the fuel injector; monitoring an electrical current amplitude of electrical fuel injection signals; detecting the mechanical openings of the fuel injector based on the monitored electrical current amplitudes of electrical fuel injection signals according to inflection points between a decreasing slope and an increasing slope in the monitored electrical current amplitudes of electrical fuel injection signals; calculating time delays between the sent electrical fuel injection signals and the mechanical openings of the fuel injector; and setting a duration of the electrical fuel injection signals based on the calculated time delays.

Example 9

The method of example 8, wherein detecting the mechanical openings of the fuel injector based on the monitored electrical current amplitudes of electrical fuel injection signals further includes detecting dips in the monitored electrical current amplitudes of electrical fuel injection signals.

Example 10

The method of any combination of examples 8 and 9, further comprising predicting a second mechanical closing time delay for the fuel injector based on the measured time delay between the sent electrical fuel injection signals and the mechanical closing of the fuel injector for a first pulse of an electrical fuel injection signal, and wherein setting the duration of the electrical fuel injection signals is further based in part on the predicted second mechanical closing time delays for the fuel injector.

Example 11

The method of any combination of examples 8-10, wherein the set duration of the electrical fuel injection signals is further based in part on a desired quantity of fuel to be delivered by the fuel injector.

Example 12

The method of any combination of examples 8-11, wherein measuring the electrical current amplitude of electrical fuel injection signals comprises detecting the electrical current amplitude of electrical fuel injection signals with a sense resistor within an electrical current path for the fuel injector.

Example 13

The method of any combination of examples 8-12, wherein the fuel injector is a port fuel injector.

Example 14

The method of any combination of examples 8-13, further comprising delivering the electrical fuel injection signals based on the set duration.

Example 15

A computer-readable storage medium that stores computer-executable instructions that, when executed, configure a control system for a fuel injector to: send electrical fuel injection signals to the fuel injector to open the fuel injector; monitor a electrical current amplitude of electrical fuel injection signals; detect mechanical openings of the fuel injector based on the monitored electrical current amplitudes of electrical fuel injection signals according to inflection points between a decreasing slope and an increasing slope in the monitored electrical current amplitudes of the electrical fuel injection signals; calculate time delays between the sent electrical fuel injection signals and the mechanical openings of the fuel injector; and set duration of the electrical fuel injection signals based on the calculated time delays.

Example 16

The computer-readable storage medium of example 15, wherein detecting the mechanical openings of the fuel injector based on the monitored electrical current amplitudes of electrical fuel injection signals further includes detecting dips in the monitored electrical current amplitudes of electrical fuel injection signals.

Example 17

The computer-readable storage medium of a combination of examples 15 and 16, wherein the computer-executable instructions that, when executed, further configure the control system for the fuel injector to predict a second mechanical closing time delay for the fuel injector based on the measured first time delay between the sent electrical fuel injection signals and the mechanical openings of the fuel injector for a first pulse of an electrical fuel injection signal, wherein the set duration of the electrical fuel injection signals is further based on the predicted closing time delays for the fuel injector.

Example 18

The computer-readable storage medium of any combination of examples 15-17, wherein the set duration of the electrical fuel injection signals is further based on a desired quantity of fuel to be delivered by the fuel injector.

Example 19

The computer-readable storage medium of any combination of examples 15-18, wherein monitor a electrical current amplitude of electrical fuel injection signals comprises monitoring the electrical current amplitude of electrical fuel injection signals based on an output of a sense resistor within an electrical current path for the fuel injector.

Example 20

The computer-readable storage medium of any combination of examples 15-19, wherein the fuel injector is a port fuel injector.

Various examples of this disclosure have been described. Modification of the described examples may be made within the spirit of this disclosure. These and other examples are within the scope of the following claims.

What is claimed is:

1. A fuel injection system for an internal combustion engine comprising:
    a fuel injector; and
    an engine control system configured to:
        send an electrical fuel injection signal to the fuel injector to open the fuel injector, wherein the electrical fuel injection signal comprises a first voltage pulse and a second voltage pulse, wherein the second voltage pulse is subsequent to the first voltage pulse;
        monitor an electrical current amplitude of the electrical fuel injection signal;
        detect an electrical current turn off time of the first voltage pulse;
        in response to detecting the electrical current turn off time of the first voltage pulse, determine a mechanical closing time of the fuel injector;
        during the second voltage pulse, detect an inflection point between a decreasing slope and an increasing slope in the monitored electrical current amplitude of the electrical fuel injection signal;
        in response to detecting the inflection point during the second voltage pulse in the monitored electrical current amplitude, determine a mechanical opening time of the fuel injector;
        calculate a time delay between a start time of the second voltage pulse and the mechanical opening time of the fuel injector; and
        set a duration of the second voltage pulse based on the calculated time delay and the mechanical closing time of the fuel injector determined for the first voltage pulse.

2. The fuel injection system of claim 1, wherein the engine control system is further configured to determine the mechanical opening time of the fuel injector in response to detecting a dip in the monitored electrical current amplitude of the electrical fuel injection signal.

3. The fuel injection system of claim 1, wherein the set duration of the second voltage pulse is further based on a desired quantity of fuel to be delivered by the fuel injector.

4. The fuel injection system of claim 1, wherein the engine control system includes a sense resistor within an electrical current path for the fuel injector to measure the electrical current amplitude of the electrical fuel injection signal.

5. The fuel injection system of claim 1, wherein the time delay between the start time of the second voltage pulse and the mechanical opening time of the fuel injector is dependent on a voltage of the electrical fuel injection signal.

6. The fuel injection system of claim 1, wherein the fuel injector is a port fuel injector.

7. A method of controlling a fuel injection system for an internal combustion engine comprising:
    sending an electrical fuel injection signal to a fuel injector to open the fuel injector, wherein the electrical fuel injection signal comprises a first voltage pulse and a second voltage pulse, wherein the second voltage pulse is subsequent to the first voltage pulse;
    monitoring an electrical current amplitude of the electrical fuel injection signal;
    detecting an electrical current turn off time of the first voltage pulse;

in response to detecting the electrical current turn off time of the first voltage pulse, determining a mechanical closing time of the fuel injector;

during the second voltage pulse, detecting an inflection point between a decreasing slope and an increasing slope in the monitored electrical current amplitude of the electrical fuel injection signal;

in response to detecting the inflection point during the second voltage pulse in the monitored electrical current amplitude, determining a mechanical opening time of the fuel injector;

calculating a time delay between a start time of the second voltage pulse and the mechanical opening time of the fuel injector; and setting a duration of the second voltage pulse based on the calculated time delay and the mechanical closing time of the fuel injector determined for the first voltage pulse.

8. The method of claim 7, further comprising detecting a dip in the monitored electrical current amplitude of the electrical fuel injection signal and, in response to detecting a dip in the monitored electrical current amplitude of the electrical fuel injection signal, determining the mechanical opening time of the fuel injector.

9. The method of claim 7, wherein setting the duration of the second voltage pulse is further based in part on a desired quantity of fuel to be delivered by the fuel injector.

10. The method of claim 7, wherein measuring the electrical current amplitude of the electrical fuel injection signal comprises detecting the electrical current amplitude of the electrical fuel injection signal with a sense resistor within an electrical current path for the fuel injector.

11. The method of claim 7, wherein the fuel injector is a port fuel injector.

12. The method of claim 7, wherein setting the duration of the second voltage pulse is further based on a desired quantity of fuel to be delivered by the fuel injector.

13. An engine control system for an internal combustion engine configured to:

send an electrical fuel injection signal to a fuel injector to open the fuel injector, wherein the electrical fuel injection signal comprises a first voltage pulse and a second voltage pulse, wherein the second voltage pulse is subsequent to the first voltage pulse;

monitor an electrical current amplitude of the electrical fuel injection signal;

detect an electrical current turn off time of the first voltage pulse;

in response to detecting the electrical current turn off time of the first voltage pulse, determine a mechanical closing time of the fuel injector;

during the second voltage pulse, detect an inflection point between a decreasing slope and an increasing slope in the monitored electrical current amplitude of the electrical fuel injection signal;

in response to detecting the inflection point during the second voltage pulse in the monitored electrical current amplitude, determine a mechanical opening time of the fuel injector;

calculate a time delay between a start time of the second voltage pulse and the mechanical opening time of the fuel injector; and set a duration of the second voltage pulse based on the calculated time delay and the mechanical closing time of the fuel injector determined for the first voltage pulse.

14. The engine control system of claim 13, wherein the engine control system is further configured to determine the mechanical opening time of the fuel injector in response to detecting a dip in the monitored electrical current amplitude of the electrical fuel injection signal.

15. The engine control system of claim 13, wherein the set duration of the second voltage pulse is further based on a desired quantity of fuel to be delivered by the fuel injector.

16. The engine control system of claim 13, wherein the engine control system includes a sense resistor within an electrical current path for the fuel injector to measure the electrical current amplitude of the electrical fuel injection signal.

17. The engine control system of claim 13, wherein the time delay between the start time of the second voltage pulse and the mechanical opening time of the fuel injector is dependent on a voltage of the electrical fuel injection signal.

18. The engine control system of claim 1, wherein the engine control system is further configured to:

determine whether the mechanical closing time overlaps the start time of the second voltage pulse; and in response to determining the mechanical closing time overlaps the start time of the second voltage pulse, reduce the duration of the second voltage pulse such that the fuel injector is mechanically closed before the start of a third voltage pulse, wherein the third voltage pulse is subsequent to the second voltage pulse.

* * * * *